United States Patent
Huang et al.

(10) Patent No.: US 8,911,895 B2
(45) Date of Patent: Dec. 16, 2014

(54) ALL SOLID STATE RECHARGEABLE OXIDE-ION BATTERY (ROB) SYSTEM

(75) Inventors: Kevin Huang, Export, PA (US); Chun Lu, Sewickley, PA (US); James L. Shull, Murrysville, PA (US); Shih-Yu W. Liu, Pittsburgh, PA (US); Gong Zhang, Murrysville, PA (US); Kevin P. Litzinger, Level Green, PA (US)

(73) Assignee: Siemens Aktiengesellschaft, München (DE)

( * ) Notice: Subject to any disclaimer, the term of this patent is extended or adjusted under 35 U.S.C. 154(b) by 810 days.

(21) Appl. No.: 13/091,334

(22) Filed: Apr. 21, 2011

(65) Prior Publication Data

US 2012/0270088 A1    Oct. 25, 2012

(51) Int. Cl.
*H01M 10/50* (2006.01)
*H01M 10/36* (2010.01)

(52) U.S. Cl.
USPC .................. 429/120; 429/210; 429/218.1

(58) Field of Classification Search
CPC ............... H01M 10/38; H01M 10/39; H01M 10/50–10/5008; H01M 10/5089; H01M 10/0562; H01M 4/02; H01M 4/13; H01M 4/38; H01M 4/50; H01M 12/08
See application file for complete search history.

(56) References Cited

U.S. PATENT DOCUMENTS

| | | | |
|---|---|---|---|
| 4,054,729 A | 10/1977 | Isenberg | |
| 6,399,247 B1 | 6/2002 | Kitayama et al. | |
| 6,468,689 B1 * | 10/2002 | Hallaj et al. | 429/120 |
| 7,396,612 B2 | 7/2008 | Ohata et al. | |
| 2009/0035662 A1 * | 2/2009 | Scott et al. | 429/231.5 |
| 2009/0320863 A1 * | 12/2009 | Fernando et al. | 131/194 |
| 2011/0033769 A1 * | 2/2011 | Huang et al. | 429/465 |

FOREIGN PATENT DOCUMENTS

| | | |
|---|---|---|
| DE | 102009000392 A1 | 7/2010 |
| WO | 0180335 A2 | 10/2001 |

OTHER PUBLICATIONS

Chun Lu et al; "Oxidation-Resistant Metal Supported Rechargeable Oxide-Ion Battery Cells and Methods to Produce the Same"; U.S. Appl. No. 12/876,391, filed Sep. 7, 2010; 12 pages.

* cited by examiner

*Primary Examiner* — Alix Echelmeyer Eggerding

(57) ABSTRACT

An all solid state rechargeable oxide-ion (ROB) battery (30) has a thermal energy storage (TES) unit (20) between two oxide-ion cells (22, 24) with metal-metal oxide electrodes (34, 36, 40, 42) on opposite sides of an anion conducting solid electrolyte (32,38) where none of the electrodes is contact with air.

5 Claims, 3 Drawing Sheets

Reaction Path 1:   $Me + xO^{2-} \rightleftharpoons MeO_x + 2xe^-$

Reaction Path 2:   $xO^{2-} \rightleftharpoons x/2 O_{2(g)} + 2xe^-$
                   $x/2 O_{2(g)} + Me \rightleftharpoons MeO_x$ $x/2 O_{2(g)} + 2xe^- \rightleftharpoons xO^{2-}$ Reaction Path 1: $Me + xO^{2-} \Longleftrightarrow MeO_x + 2xe^-$ Reaction Path 2: $xO^{2-} \Longleftrightarrow x/2 O_{2(g)} + 2xe^-$
$x/2 O_{2(g)} + Me \Longleftrightarrow MeO_x$ $x/2 O_{2(g)} + 2xe^- \Longleftrightarrow xO^{2-}$

ALL SOLID STATE RECHARGEABLE OXIDE-ION BATTERY (ROB) SYSTEM

BACKGROUND OF THE INVENTION

1. Field of the Invention

This present invention relates to new, solid state designs for rechargeable oxide-ion battery (ROB) cells.

2. Description of Related Art

Electrical energy storage is crucial for the effective proliferation of an electrical economy and for the implementation of many renewable energy technologies. During the past two decades, the demand for the storage of electrical energy has increased significantly in the areas of portable, transportation, load-leveling and central backup applications. The present electrochemical energy storage systems are simply too costly to penetrate major new markets. Higher performance is required, and environmentally acceptable materials are preferred. Transformational changes in electrical energy storage science and technology are in great demand to allow higher and faster energy storage at lower costs and longer lifetimes necessary for major market enlargement. The nature of variable electricity production by renewable energy resources requires an effective means of storing surplus renewable energy for peak utility consumption ("peak shaving") in order for the entire energy system to be reliable and efficient. Most of these changes require new materials and/or innovative concepts, with demonstration of larger redox capacities that react more rapidly and reversibly with cations and/or anions.

Batteries are by far the most common form of storing electrical energy, ranging from: standard every day lead-acid cells, nickel-metal hydride (NiMH) batteries taught by Kitayama in U.S. Pat. No. 6,399,247 B1, metal-air cells taught by Isenberg in U.S. Pat. No. 4,054,729, and to the lithium-ion battery taught by Ohata in U.S. Pat. No. 7,396,612 B2. These latter metal-air, nickel-metal hydride and lithium-ion battery cells require liquid electrolyte systems.

Batteries range in size from button cells used in watches, to megawatt load leveling applications. They are, in general, efficient storage devices, with output energy typically exceeding 90% of input energy, except at the highest power densities. Rechargeable batteries have evolved over the years from lead-acid through nickel-cadmium and nickel-metal hydride (NiMH) to lithium-ion batteries. NiMH batteries were the initial workhorse for electronic devices such as computers and cell phones, but they have almost been completely displaced from that market by lithium-ion batteries because of the latter's higher energy storage capacity. Today, NiMH technology is the principal battery used in hybrid electric vehicles, but it is likely to be displaced by the higher power energy and now lower cost lithium batteries, if the latter's safety and lifetime can be improved. Of the advanced batteries, lithium-ion is the dominant power source for most rechargeable electronic devices.

What is needed is a dramatically new electrical energy storage device that can easily discharge and charge a high capacity of energy quickly and reversibly, as needed. What is also needed is a device that can operate for years without major maintenance. What is also needed is a device that does not need to operate on natural gas, hydrocarbon fuel or its reformed by-products such as $H_2$ and CO. One possibility is a rechargeable oxide-ion battery (ROB), as set out, for example, in Siemens application Ser. No. 12/695,386, filed on Jan. 28, 2010, and Siemens application Ser. No. 12/876,391, filed on Sep. 7, 2010.

A ROB comprises a metal electrode, an oxide-ion conductive electrolyte, and an air electrode which air contacts. The metal electrode undergoes reduction-oxidation cycles during charge and discharge processes for energy storage. For example, in discharging mode, the metal is oxidized:

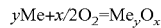

and is reduced in charging mode:

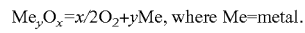

Because the metal redox reactions are accompanied by large volume variation, for instance, if manganese (Mn) metal is used, the volume change associated with reaction of $Mn+½O_2=MnO$ is 1.73 times. In the case of tungsten (W), the volume change is 3.39 times when W is totally oxidized to $WO_3$. Without appropriately designed electrode, such drastic volume variation in practice can lead to spallation of metal electrode and possible failure of a ROB cell. The electrode, comprising a porous structural skeleton with the attached active metal component on its wall has been considered as an effective solution to address the volume issue. The skeleton is made of single and/or multiple components and is capable of conducting electrical current, and it contains active metal component in its pores. The skeleton maintains its structural integrity by accommodating the volume change associated with metal redox reactions in its pores.

The metal electrode must meet the following requirements to be effective in practice. It must be compatible with adjacent components including electrolyte and interconnect during battery fabrication and operation in terms of minimal mismatch in coefficient of thermal expansion and negligible chemical reactions with the electrolyte and interconnect. It must possess adequate electrical conductivity to minimize its Ohmic loss. It must possess sufficient catalytic activity to promote metal redox reaction to reduce polarization losses.

The working principles of a rechargeable oxide-ion battery cell 10 are schematically shown in FIG. 1. In discharge mode, oxide-ion anions migrate from high partial pressure of oxygen side (air electrode-12) to low partial pressure of oxygen side (metal electrode-14) under the driving force of gradient of oxygen chemical potential. There exist two possible reaction mechanisms to oxidize the metal. One of them, solid-state diffusion reaction as designated as Path 1, is that oxide ion can directly electrochemically oxidize metal to form metal oxide. The other, gas-phase transport reaction designated as Path 2, involves generation and consumption of gaseous phase oxygen. The oxide ion can be initially converted to gaseous oxygen molecule on metal electrode, and then further reacts with metal via solid-gas phase mechanism to form metal oxide. In charge mode, the oxygen species, released by reducing metal oxide to metal via electrochemical Path 1 or solid-gas mechanism Path 2, are transported from metal electrode back to air electrode. To enable the electrochemical reactions listed in FIG. 1, the electrical current must be conducted sufficiently along its path including the metal electrode. Thus, electrically conductive materials must be used to produce the metal electrode. The candidate metal negative (anode) electrode materials for the ROB cell include electrically conductive ceramics such as doped $LaCrO_3$, doped $SrTiO_3$, and doped $LaVO_3$.

Different from the metal electrode where oxygen is stored in condensed phases, the oxygen electrode does not contain the reactive oxygen species in a chemical. Instead, oxygen molecules submerge into or emerge from a flowing air reservoir, retaining a constant partial pressure of oxygen during operational cycles. One advantage of such a design is that air can be used as a means of regulating temperature distributions within the battery stack during the exothermic discharging and endothermic charging cycles. However, the use of hot air requires peripheral subsystems to support on-demand variable air flows. Uncontrollable air leakage into the negative electrode could easily consume all the active metals and result in a complete loss of the performance. The ultimate consequences of these drawbacks are the lowered performance, reduced efficiency and increased system cost.

Therefore, there is a great need to advance the current ROB by an alternative design to eliminate the use of air at the oxygen electrode in order to meet the targets of performance, cost and reliability.

It is a main object of this invention to provide cost effective all solid-state ROB cell eliminating the need for air at the oxygen electrode.

SUMMARY OF THE INVENTION

This invention is aimed at describing a new type of advanced all solid state ROB battery system. Specifically, the perovskite oxygen electrode is replaced by a new solid state material as an alternative oxygen reservoir. To regulate the battery stack temperature distribution during operational cycles, a new thermal energy storage (TES) unit is integrated into the battery stack so that the battery system can operate isothermally, that is, the TES unit stores heat given off from the exothermic discharging reaction by transforming from solid to liquid phase and the opposite, i.e., vice versa for the endothermic charging reaction. The disclosed new advanced ROB system is compact, modular and scalable, and therefore is envisioned to be energy efficient and cost effective.

Therefore, the above object is accomplished by providing a solid state rechargeable oxide-ion battery capable of charging and discharging, comprising: (a) a first anion conducting solid electrolyte, (b) a first set of three layers consisting of two electrodes on opposite sides of the first electrolyte, each electrode consisting essentially of different metal-metal oxide combinations, where neither electrode is contacted by air, (c) a thermal energy storage unit, (d) a repeating anion conducting solid electrolyte, (e) a set of three layers consisting of two electrodes on opposite sides of the repeating electrolyte, each electrode consisting essentially of different metal-metal oxide combinations, where no electrode is or need be, or is required to be, contacted by an oxidant such as most usually air; and wherein the thermal energy unit is between the first set of electrodes and the second set of electrodes. The two electrodes on opposite sides of the thermal storage unit must have opposite polarity.

The invention also encompasses steps (a), (b), (c), (d) and (e) above where a battery bank is formed which battery bank is electrically connected in series and the battery bank is enclosed in a vacuum. The two sets of electrode pairs can be constructed of, for example, Ti—$TiO_2$, Co—CoO, V—VO, Cr—$Cr_2O_3$, Fe—FeO, Mn—MnO, Pb—PbO, Ni—NiO, Cu—CuO and Ce—CeO and their mixtures, preferably, Ti—$TiO_2$, CO—CoO, $Fe_2$—FeO, Ph-PbO, Cu—CuO, Mn—MnO and Ce, $CeO_2$ and their mixtures.

BRIEF DESCRIPTION OF THE DRAWINGS

For a better understanding of the invention, reference may be made to the preferred embodiments exemplary of this invention, shown in the accompanying drawings in which.

DESCRIPTION OF THE PREFERRED EMBODIMENTS

To search for new electrode materials, it is important to first understand the basic requirements for being a good electrode. A good electrode material should possess the following basic characteristics: 1) enabling a high EMF; 2) promoting reversible and facile oxygen redox kinetics; and 3) containing high oxygen deficiency in the oxide phase.

One of the current ROB cell configuration can be expressed as $$(-)Fe, FeO|O^{2-}\text{-conductor}|Pt \text{ or } LSM, air(+). \quad (1)$$

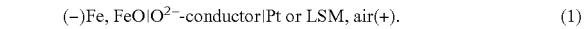

The air at the oxygen electrode acts as a constant-concentration oxygen reservoir while oxygen in the metal electrode transfers between Fe and FeO during operational cycles. Due to the high oxygen concentration in air, the above battery configuration is less favorable to the charging cycle because more energy is required to overcome the high chemical potential of oxygen in the charging cycle, in addition to slower kinetics of FeO reduction than Fe oxidation. Therefore, the performance of a current ROB cell is generally better for the discharging cycle than for the charging cycle.

In the disclosed advanced ROB concept, the perovskite/oxygen electrode will be replaced by a pair of metal and metal oxide electrodes. It is, therefore, a metal-metal oxide/metal-oxide cell. The oxygen will then transfer between metal and metal oxide of both electrodes. One cell configuration using binary metal-metal oxide pairs can be expressed as $$A, AO_x|O^{2-}\text{-conductor}\}B, BO_y \quad (2)$$

As the metal in one electrode is being oxidized, the metal oxide in another electrode is undergoing reduction. The EMF of cell configuration (2) can be determined by Nernst equation, $$EMF = \frac{RT}{nF} ln \frac{P_{O_2}(B - BO_y)}{P_{O_2}(A - AO_x)} \quad (3)$$

where EMF=electromotive force, R=8.314 J/mole/K, T=temperature, in K; F=96500 C/mole; n is the number of electrons transferred during the electrode reaction; P is the partial pressures of oxygen; and y is the oxygen stoichiometry.

Figure 1:
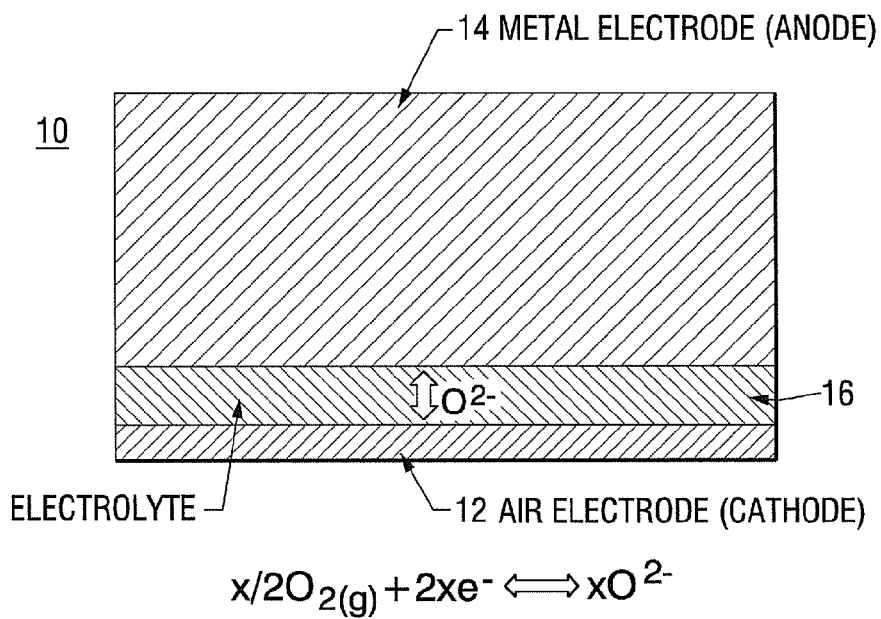
FIG. 1 illustrates the known working principals of a rechargeable oxide-ion battery (ROB) cell.
Figure 2:
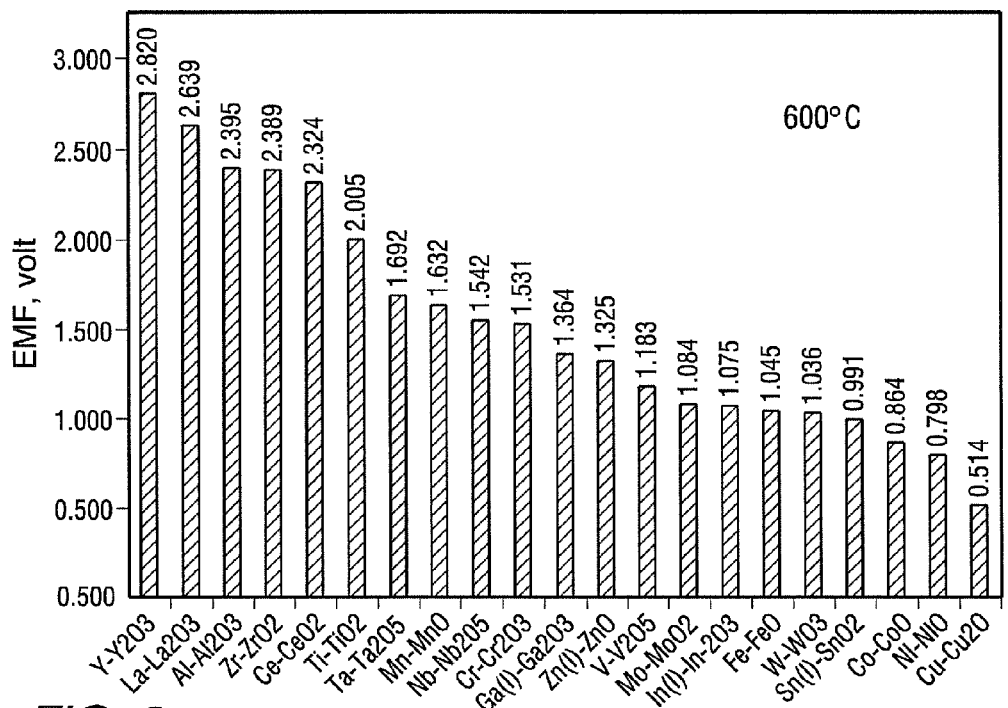
FIG. 2 illustrates EMF values vs. air of various metal/metal-oxide systems at 600° C.

FIG. 2 shows the calculated EMF volts values at 600° C. for a cell with configuration (1) using various metals/metal-oxides as the metal electrode and the oxygen electrode. The difference between any of two metal/metal-oxide pairs represents the EMF of a cell assembled in configuration (2) using the same pair as the electrodes. For example, if Ti—$TiO_2$ and Co—CoO are chosen as the pair electrodes, the resultant EMF of cell configuration (2) is the high thermodynamic efficiency (>90%) due to the absence of gaseous phases involved in the chemical reactions.

Another variation to cell configuration (2) is to use a pair of oxygen deficient oxides as one of the electrodes such as $$A, AO_x|O^{2-}\text{-conductor}|BO_y, BO_z \quad (4)$$

Figure 3:
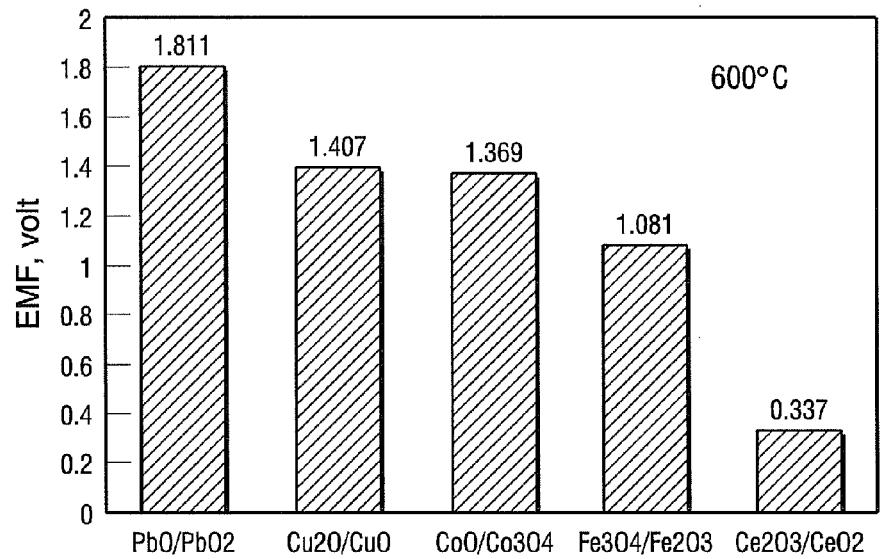
FIG. 3 illustrates EMF values vs. Mn—MnO of various metal-oxide/metal-oxide systems at 600° C.

The thermodynamic equilibrium between $BO_y$ and $BO_z$ also establishes a fixed partial pressure of oxygen, which in pair with $A\text{-}AO_x$ controls the EMF. FIG. 2 shows the calculated EMF at 600° C. of cells with Mn—MnO as the metal electrode and $BO_y$, $BO_z$ (B=Fe, Co, Pb, Cu and Ce, among others) as the oxygen electrode with Fe and Mn the preferred combination. Clearly, the element B must have more than one valent state in order for oxygen to transfer. The EMF can be made high if the electrode pair is properly selected, compare FIG. 2. The difference between y and z indicates how much oxygen can be stored and therefore the energy density of the battery. In this perspective, $PbO_2/PbO$ is a better choice for high energy density storage among those presented in FIG. 3.

Regulating temperature distributions within the advanced all solid state ROB stack is crucial since using fluidic air to control the stack temperature is no longer an option. Here, we disclose a phase-change-in-principle thermal storage (TES) unit that functions as an isothermal heat reservoir that adsorbs and releases the heat during operational cycles. During the exothermic cycle, the heat liberated is stored in the TES unit by melting solid into liquid while during the endothermic cycle, the heat is extracted from the TES unit to the stack by solidifying liquid into solid. The operating temperature of the stack is controlled by the TES unit. The key is to find a suitable TES material whose phase-transition temperature matches to the operating temperature of the ROB, namely 600° C.

There are a large number of TES materials available on the market, but most have melting temperatures in the range of 100° C.-200° C. An aluminum alloy such as Al—Si is a potential TES material. This alloy has a melting point of 570° C., a perfect match to the operating temperature of the ROB, and superior thermal and fluidic properties: high thermal capacity 1.75 kJ/kg/K or volumetric heat capacity 685 kWh/m³ (equivalent to 7 times of water), high thermal conductivity 150 W/m/K, high fluidity and low solidification volume contraction. All these properties make this alloy ideal for thermal storage applications of advanced ROB. The potential TES alloys are selected from the group consisting of Al—Si, Al—Fe, Al—Cu, Al—Mg, mixtures thereof, and the like.

Figure 4:
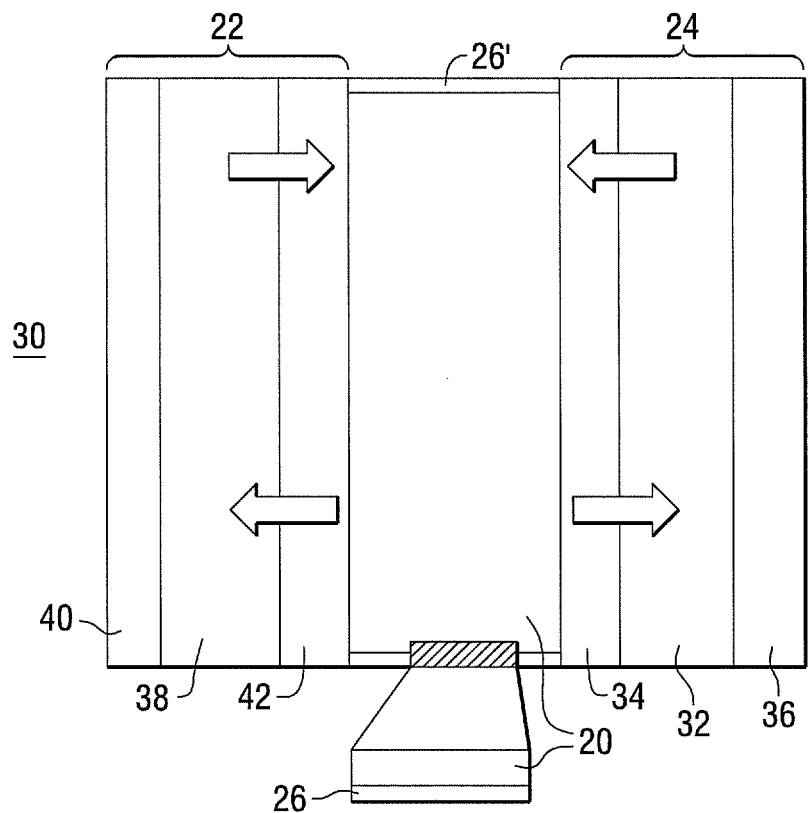
FIG. 4, which best illustrates the invention, is a schematic illustration of a ROB battery stack, with an enlarged portion showing an integrated TES unit within a ROB battery stack.
Figure 5:
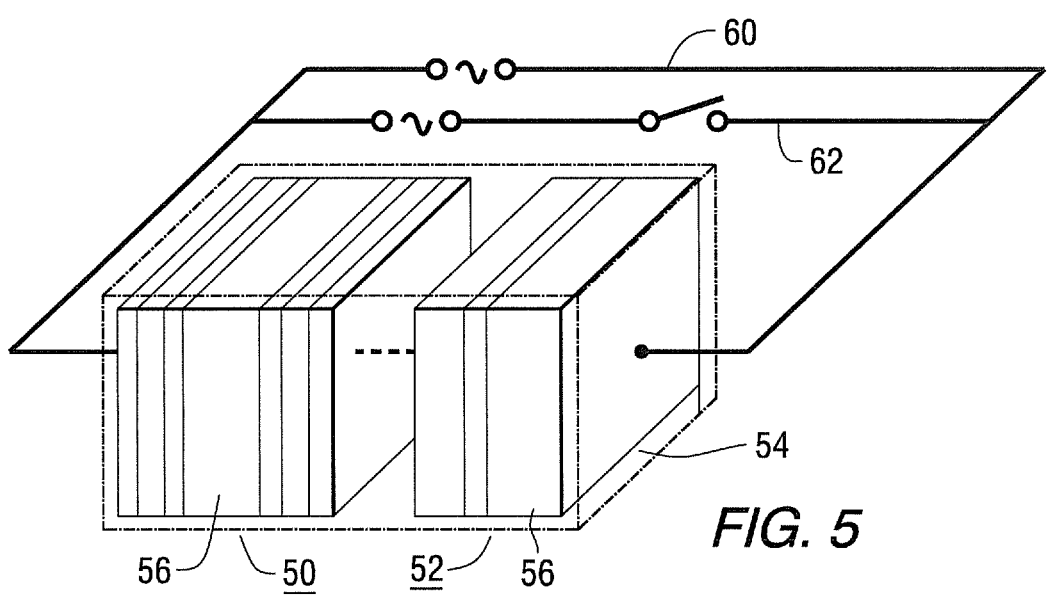
FIG. 5 is a three-dimensional schematic of an advanced all solid-state ROB battery bank system of this invention.

FIG. 4 shows a conceptual schematic of the Al-alloy based TES unit 20, integrated between two ROB cells 22 and 24. The TES 20 in FIGS. 4 and 56 in FIG. 5, is virtually encapsulated inside a bi-polar metal alloy, preferably a bipolar, stainless steel plate 26 and 26', that connects the two ROB cells 22 and 24. Such an integrated design allows efficient heat transfer during the charging and discharging cycles and enables a perfect isothermal operation of the stack. The isothermal operation is critically important to ensure the reliability of the system benefited from much reduced thermal stresses.

Thus, the invention is a solid state rechargeable oxide-ion battery comprising two oxide-ion cells, each having metal-metal oxide electrodes on opposite sides of an anion conducting solid electrolyte where none of the electrodes is contacted with air and where a metal-alloy based thermal energy storage unit encapsulated in bi-polar metals, metal combinations, such as stainless steel or other super alloys such as Inconel or Hastalloys both well known in the art, and is integrated between the two oxide-ion cells. More specifically, the invention is, as shown in FIG. 4, a solid state rechargeable oxide-ion battery 30 comprising: a first anion conducting solid electrolyte 32, a first set of electrodes 34 and 36 on opposite sides of the first electrolyte 32, each electrode consisting essentially of different metal-metal oxide combinations, where neither electrode is contacted by air, a thermal energy storage unit 20, a second/repeating anion conducting solid electrolyte 38, a second/repeating set of two electrodes 40 and 42 on opposite sides of the second/repeating electrolyte 38, each electrode consisting essentially of different metal-metal oxide combinations, where neither electrode is contacted by air; wherein the thermal energy unit is between the first set of electrodes 34 and 36, and the second repeating set of electrodes 40 and 42. The two repeating battery units on opposite sides of TES 20 must be arranged in such a way that the battery bank is electrically in series.

A conceptual schematic of the proposed all solid state ROB stack bank is shown in FIG. 5, as an array of cell banks 50 and 52 connected in series. Since no air is involved, the stack bank becomes much more compact, modular and scalable. Initial start-up requires guide heaters to preheat the stack to operating temperature of 600° C. Upon discharging, the heat liberated from the exothermic reaction is sufficient to maintain the stack temperature with excess heat being stored in the TES units 56. At the charging cycle, the endothermic reaction reverses the heat flow from the TES to the battery. To minimize the oxygen leakages into the electrodes, the overall stack can be installed into a sealed compartment 54 where vacuum can be used as a protection layer. The vacuum can also serve as a thermal insulating layer to prevent the heat loss to the environment. The bipolar plate (not shown) TES unit is shown as 56. Electricity stored can be passed to a smart grid via circuit 60 and electricity from, for example, a wind farm can be fed into the stack via circuit 62.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A solid state rechargeable oxide-ion battery capable of charging and discharging, comprises two oxide-ion cells each having metal-metal oxide electrodes on opposite sides of an anion conducting solid electrolyte where none of the electrodes is contacted with air and where a metal alloy based thermal energy storage unit encapsulated in bi-polar metal alloy is integrated between the two oxide-ion cells.

2. The rechargeable oxide-ion battery of claim 1 wherein, in the electrodes, the metal of metal-metal oxide is selected from the group consisting of Ti—$TiO_2$, Co—CoO, V—VO, Cr—$Cr_2O_3$, Fe—FeO, Mn—MnO, Pb—PbO, Ni—NiO, Cu—CuO, Ce—$CeO_2$, and mixtures thereof.

3. The rechargeable oxide-ion battery of claim 1 wherein, in the electrodes, the metal of metal-metal oxide is a Fe and Mn combination.

4. The rechargeable oxide-ion battery of claim 1, wherein the thermal energy storage unit is an Al alloy.

5. The rechargeable oxide-ion battery of claim 1, wherein the thermal energy storage unit stores heat given off from an exothermic discharging reaction by transforming from solid to liquid phase and the opposite for an endothermic charging reaction.

* * * * *